US012755382B2

(12) United States Patent
Takagi

(10) Patent No.: US 12,755,382 B2
(45) Date of Patent: Oct. 6, 2026

(54) MANAGEMENT APPARATUS, MANAGEMENT METHOD, MANAGEMENT SYSTEM, PROGRAM, AND RADIOLOGY INFORMATION SYSTEM

(71) Applicant: Konica Minolta, Inc., Tokyo (JP)

(72) Inventor: Tatsuya Takagi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 224 days.

(21) Appl. No.: 18/796,358

(22) Filed: Aug. 7, 2024

(65) Prior Publication Data

US 2025/0054141 A1 Feb. 13, 2025

(30) Foreign Application Priority Data

Aug. 10, 2023 (JP) ................................ 2023-131507

(51) Int. Cl.
*G06T 7/00* (2017.01)

(52) U.S. Cl.
CPC .. *G06T 7/0012* (2013.01); *G06T 2207/10116* (2013.01); *G06T 2207/30168* (2013.01)

(58) Field of Classification Search
CPC ......... G06T 7/0012; G06T 2207/10116; G06T 2207/30168; A61B 6/54; A61B 6/42; A61B 6/4405; A61B 6/46; A61B 6/52; G16H 30/20; G16H 40/63
See application file for complete search history.

(56) References Cited

FOREIGN PATENT DOCUMENTS

JP 2022-011259 A 1/2022
JP 2022170113 A * 11/2022 ........... A61B 6/5211

* cited by examiner

*Primary Examiner* — Kiho Kim
(74) *Attorney, Agent, or Firm* — LUCAS & MERCANTI, LLP

(57) ABSTRACT

Provided is a management apparatus including: a storage that stores quality control information, which is information on an imaging capability of a radiography apparatus; and a hardware processor that determines whether dynamic imaging by the radiography apparatus is possible in response to a dynamic imaging request, based on the quality control information.

14 Claims, 5 Drawing Sheets

| | DYNAMIC ANALYSIS PROCESSING A | DYNAMIC ANALYSIS PROCESSING B | DYNAMIC ANALYSIS PROCESSING C |
|---|---|---|---|
| IMAGING APPARATUS 1 | POSSIBLE | POSSIBLE | IMPOSSIBLE |
| IMAGING APPARATUS 2 | IMPOSSIBLE | IMPOSSIBLE | POSSIBLE |
| IMAGING APPARATUS 3 | POSSIBLE | POSSIBLE | POSSIBLE |
| IMAGING APPARATUS 4 | POSSIBLE | IMPOSSIBLE | IMPOSSIBLE |

FIG. 3

| | IMAGING APPARATUS 1 | IMAGING APPARATUS 2 | IMAGING APPARATUS 3 | IMAGING APPARATUS 4 |
|---|---|---|---|---|
| IMAGING REQUEST 1 (DYNAMIC ANALYSIS PROCESSING A) | POSSIBLE | IMPOSSIBLE | POSSIBLE | POSSIBLE |
| IMAGING REQUEST 2 (DYNAMIC ANALYSIS PROCESSING B) | POSSIBLE | IMPOSSIBLE | POSSIBLE | IMPOSSIBLE |
| IMAGING REQUEST 3 (DYNAMIC ANALYSIS PROCESSING C) | IMPOSSIBLE | POSSIBLE | POSSIBLE | IMPOSSIBLE |
| IMAGING REQUEST 4 (DYNAMIC ANALYSIS PROCESSING B AND C) | IMPOSSIBLE | IMPOSSIBLE | POSSIBLE | IMPOSSIBLE |

FIG. 4

| | | |
|---|---|---|
| IMAGING REQUEST 1 (DYNAMIC ANALYSIS PROCESSING A) | IMAGING APPARATUS 1 | POSSIBLE |
| | IMAGING APPARATUS 2 | IMPOSSIBLE |
| | IMAGING APPARATUS 3 | POSSIBLE |
| | IMAGING APPARATUS 4 | POSSIBLE |
| IMAGING REQUEST 2 (DYNAMIC ANALYSIS PROCESSING B) | IMAGING APPARATUS 1 | POSSIBLE |
| | IMAGING APPARATUS 2 | IMPOSSIBLE |
| | IMAGING APPARATUS 3 | POSSIBLE |
| | IMAGING APPARATUS 4 | IMPOSSIBLE |

FIG. 5

| | | |
|---|---|---|
| IMAGING APPARATUS 1 | IMAGING REQUEST 1 (DYNAMIC ANALYSIS PROCESSING A) | POSSIBLE |
| | IMAGING REQUEST 2 (DYNAMIC ANALYSIS PROCESSING B) | POSSIBLE |
| | IMAGING REQUEST 3 (DYNAMIC ANALYSIS PROCESSING C) | IMPOSSIBLE |
| | IMAGING REQUEST 4 (DYNAMIC ANALYSIS PROCESSING B AND C) | IMPOSSIBLE |
| IMAGING APPARATUS 2 | IMAGING REQUEST 1 (DYNAMIC ANALYSIS PROCESSING A) | IMPOSSIBLE |
| | IMAGING REQUEST 2 (DYNAMIC ANALYSIS PROCESSING B) | IMPOSSIBLE |
| | IMAGING REQUEST 3 (DYNAMIC ANALYSIS PROCESSING C) | POSSIBLE |
| | IMAGING REQUEST 4 (DYNAMIC ANALYSIS PROCESSING B AND C) | IMPOSSIBLE |

FIG. 6

MANAGEMENT APPARATUS, MANAGEMENT METHOD, MANAGEMENT SYSTEM, PROGRAM, AND RADIOLOGY INFORMATION SYSTEM

CROSS REFERENCE TO RELATED APPLICATIONS

The entire disclosure of Japanese Patent Application No. 2023-131507, filed on Aug. 10, 2023, is incorporated herein by reference in its entirety.

BACKGROUND

Technological Field

The present disclosure relates to a management apparatus, a management method, a management system, a program, and a radiology information system.

Description of Related Art

In X-ray imaging, imaging requests are registered in radiology information systems called RIS (radiology information systems). A clinical laboratory technician sets imaging conditions and the like based on an imaging request registered in an RIS, and X-ray imaging is performed by an imaging apparatus.

In recent years, it is known that image analysis is performed on dynamic images acquired by X-ray dynamic imaging to visualize and quantify information on specific diseases.

The radiography apparatus performs dynamic imaging in which pulsed radiation is continuously emitted from a radiation source and continuous frame images corresponding to each pulse are generated in each of a plurality of detection elements arranged in a two-dimensional shape. Dynamic analysis processing, which is image analysis for calculating a feature amount corresponding to a disease of a patient to be diagnosed, is performed on a plurality of frame images generated by dynamic imaging, that is, dynamic images. In the dynamic imaging, radiation may be continuously emitted, and a frame image may be generated for each predetermined time in a detection element.

Examples of the dynamic analysis processing on a dynamic image include ventilation analysis processing of analyzing ventilation, blood flow analysis processing of analyzing the blood flow, and structure analysis processing of analyzing the movement of a structure such as a bone or an internal organ. For example, the ventilation analysis processing makes it easier for a doctor to grasp a series of movements related to the ventilation of a patient, and thus, it is possible to accurately diagnose the patient. In addition, since the blood flow analysis processing makes it easier for a doctor to grasp a series of movements related to the blood flow of a patient, and thus, it is possible to accurately diagnose the patient. That is, the dynamic analysis processing enables a doctor to accurately diagnose a patient.

For example, Japanese Patent Publication Laid-Open No. 2022-11259 discloses a quality control method for efficiently performing quality control of dynamic imaging by outputting information on qualities of dynamic images obtained by the dynamic imaging and information on functions of a radiography apparatus used for the dynamic imaging.

However, studies on dynamic imaging in medical sites have been revealing the qualities of images necessary for dynamic analysis processing for examining a certain disease, that is, a processing mode. To image an image with a necessary quality, a radiography apparatus needs to have a predetermined imaging capability (e.g., resolution). That is, in order to perform each dynamic analysis processing, it is necessary to use an imaging apparatus having a predetermined imaging capability. When imaging is performed using an apparatus that cannot obtain an image with a resolution necessary for imaging, an appropriate dynamic analysis result may not be obtained. Such imaging is wasteful and increases the amount of radiation exposure of a patient.

SUMMARY

An object of the present disclosure is to grasp, before imaging, whether an imaging apparatus has a capability to obtain an image necessary for dynamic analysis processing, and to determine whether imaging is possible, thereby stopping wasteful imaging and reducing the amount of radiation exposure of a patient.

A management apparatus in an embodiment of the present disclosure includes: a storage that stores quality control information which is information on an imaging capability of a radiography apparatus; and a determiner that determines, based on the quality control information, whether dynamic imaging by the radiation imaging apparatus is possible in response to a dynamic imaging request.

A radiology information system in an embodiment of the present disclosure includes a management apparatus that includes: a storage that stores quality control information which is information on an imaging capability of a radiography apparatus; and a determiner that determines whether dynamic imaging by the radiation imaging apparatus is possible in response to a dynamic imaging request, based on the quality control information.

A management method in an embodiment of the present disclosure includes: processing, in a system to which a radiography apparatus is connected, a dynamic imaging request that has been inputted; and determining, in the system, whether imaging by the radiography apparatus is possible in response to the dynamic imaging request, based on quality control information which is information on an imaging capability of the radiography apparatus.

A program in an embodiment of the present disclosure is stored in a non-transitory computer-readable recording medium and causes a computer to execute: processing a dynamic imaging request that has been inputted; and determining whether dynamic imaging by the radiography apparatus is possible, based on quality control information which is information on an imaging capability of a radiography apparatus.

A management system in an embodiment of the present disclosure stores quality control information which is information on an imaging capability of a radiography apparatus, and determines whether dynamic imaging by the radiography apparatus in response to a dynamic imaging request is possible, based on the quality control information.

Note that, these generic or specific aspects may be implemented as a system, an apparatus, a method, an integrated circuit, a computer program, or a recording medium, or any selective combination of a system, an apparatus, a method, an integrated circuit, a computer program, and a recording medium.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating an example of quality control information stored in a quality control information DB;

FIG. 4 is a diagram illustrating exemplary results of determination, by a processing section, of imaging apparatuses capable of performing imaging, in which the imaging apparatuses can perform necessary dynamic analysis processing, in response to imaging requests;

FIG. 5 is a diagram illustrating display examples of whether the imaging apparatuses can perform imaging in response to each imaging request;

FIG. 6 is a diagram illustrating display examples of whether each imaging apparatus can process imaging requests;

DETAILED DESCRIPTION OF EMBODIMENTS

Hereinafter, one or more embodiments of the present invention will be described with reference to the drawings. However, the scope of the invention is not limited to the disclosed embodiments.

Hereinafter, embodiments of the present disclosure will be described in detail with reference to the accompanying drawings as appropriate.

System Configuration

First, a schematic configuration of a management apparatus according to an embodiment of the present disclosure will be described.

Figure 1:
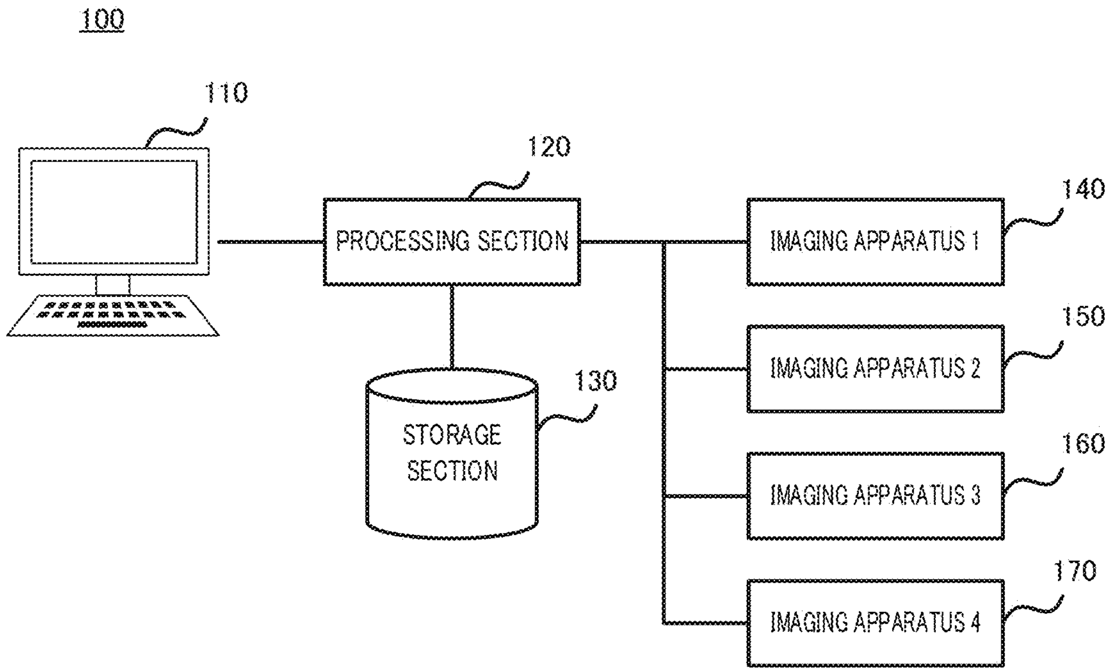
FIG. 1 is a diagram illustrating a configuration of an RIS.

FIG. 1 is a diagram illustrating a configuration of RIS 100.

For example, in a case where four imaging apparatuses are present in a hospital, RIS 100 is constituted by input/output section 110, processing section 120, storage section 130, and imaging apparatuses 1 to 4. The number of imaging apparatuses is not limited to four. The imaging apparatus is, for example, a radiography apparatus that performs imaging using radiation such as X-rays.

An imaging request is inputted to input/output section 110 by, for example, a doctor.

Processing section 120 determines an imaging apparatus for processing an imaging request inputted by a doctor, and transfers the imaging request to the determined imaging apparatus. A technician of the imaging apparatus performs imaging based on the transferred imaging request. Processing section 120 may include an imaging request queue in which inputted imaging requests are accumulated, and may collectively process imaging requests accumulated in the imaging request queue. The imaging request is, for example, a dynamic imaging request.

Storage section 130 stores quality control information.

The determination as to which imaging apparatus is used in response to an imaging request is made by management apparatus 200.

Figure 2:
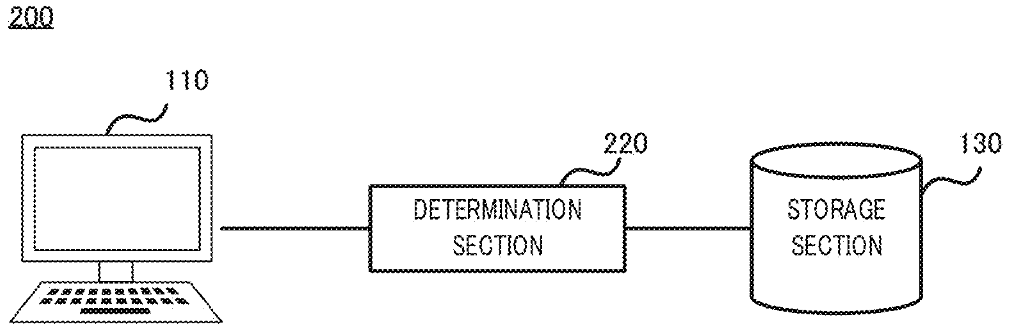
FIG. 2 is a diagram illustrating a configuration of a management apparatus.

FIG. 2 is a diagram illustrating a configuration of management apparatus 200.

Management apparatus 200 is constituted by input/output section 110, determination section 220, and storage section 130. Management apparatus 200 may be configured as a part of RIS 100.

An imaging request is inputted to input/output section 110 by a doctor. An imaging request may be inputted to RIS 100 by a doctor, and management apparatus 200 may acquire the imaging request from RIS 100. In addition, input/output section 110 outputs a determination result of determination section 220.

Determination section 220 determines, based on the imaging request inputted from input/output section 110 and the quality control information stored in storage section 130, whether each imaging apparatus is capable of performing the requested imaging. The imaging request includes detailed information such as the type of dynamic analysis processing, for example, what type of dynamic analysis processing is to be performed. Determination section 220 may determine the corresponding imaging apparatus according to the dynamic analysis processing included in the imaging request after the processing of determining what type of dynamic analysis processing is to be performed for the imaging request acquired from input/output section 110 is executed.

Determination section 220 may be, for example, a computer such as a central processing section (CPU). Determination section 220 may be a computer on a cloud.

Determination section 220 can determine an imaging apparatus capable of performing imaging, in which the imaging apparatus can perform necessary dynamic analysis processing, in response to an imaging request.

Storage section 130 may be a quality control information database (DB).

The quality control information DB stores quality control information. The dynamic analysis processing has evaluation modes corresponding to diagnostic purposes (diseases to be diagnosed), and the resolution of an image necessary for the dynamic analysis processing (required resolution) varies depending on the evaluation modes. For example, the required resolution is high in an evaluation mode corresponding to a certain diagnostic purpose, and the required resolution is low in another evaluation mode corresponding to another diagnostic purpose. Since a dynamic image imaged by a radiography apparatus that does not have a sufficient capability fails to satisfy the required resolution, management apparatus 200 cannot execute dynamic analysis processing in the evaluation mode for diagnosing a disease, and imaging is wasted. That is, it is necessary to determine the imaging capability of a radiography apparatus as to whether the radiography apparatus can image a dynamic image with a required resolution corresponding to the use in a specific evaluation mode of dynamic analysis processing. The quality control information is information for determining whether a radiography apparatus satisfies the capability necessary for imaging for each evaluation mode, and is information on the imaging capability of the radiography apparatus (imaging specifications). The quality control information may be information indicating whether each radiography apparatus can obtain an image with a quality necessary for performing dynamic analysis processing.

The quality control information DB may be, for example, a storage means such as a hard disk drive (HDD) or a solid state drive (SSD). The quality control information DB may be a storage means on a cloud.

FIG. 3 is a diagram illustrating an example of quality control information stored in the quality control information DB.

The quality control information is information indicating whether each radiography apparatus can obtain an image with a quality necessary for performing dynamic analysis processing. For example, FIG. 3 illustrates that imaging apparatus 1 can image an image with a quality necessary for performing dynamic analysis processing A and dynamic analysis processing B, but cannot image an image with a quality necessary for performing dynamic analysis processing C; imaging apparatus 2 can image an image with a quality necessary for performing dynamic analysis processing C, but cannot image an image with a quality necessary for performing dynamic analysis processing A and dynamic analysis processing B; imaging apparatus 3 can image an image with a quality necessary for performing each of dynamic analysis processing A, dynamic analysis processing B, and dynamic analysis processing C; and imaging apparatus 4 can image an image with a quality necessary for performing dynamic analysis processing A, but cannot image an image with a quality necessary for performing dynamic analysis processing B and dynamic analysis processing C. The number of imaging apparatuses may not be four, and the types of dynamic analysis processing may not be three.

Embodiment 1

Embodiment 1 indicates, for example, a case in which a management apparatus executes processing based on an imaging request from a doctor.

For example, in a case where imaging including "dynamic analysis processing A" is requested from input/output section 110, determination section 220 can determine by referring to the quality control information of FIG. 3 stored in storage section 130 that imaging apparatus 1, imaging apparatus 3, and imaging apparatus 4 can image images with a quality necessary for dynamic analysis processing A, but imaging apparatus 2 cannot image an image with a quality necessary for dynamic analysis processing A.

The information (result) determined by determination section 220 is outputted from input/output section 110.

For example, input/output section 110 may receive an imaging request from a doctor and display the result. Input/output section 110 displays an imaging apparatus that can perform imaging in response to an imaging request. Input/output section 110 may also display an imaging apparatus that cannot perform imaging. Input/output section 110 may also display whether each imaging apparatus can perform requested imaging.

For example, an imaging request may be inputted to input/output section 110 from the RIS, and the result may be outputted to the RIS. Upon acquiring an imaging request registered in the RIS, input/output section 110 may output, to the RIS, an imaging apparatus(s) capable of performing imaging in response to each imaging request.

FIG. 4 is a diagram illustrating exemplary results of determination, by determination section 220, of imaging apparatuses capable of performing imaging, in which the imaging apparatuses can perform necessary dynamic analysis processing, in response to imaging requests. A plurality of pieces of dynamic analysis processing may be included in an imaging request.

In a case where the imaging request includes an imaging condition, dynamic analysis processing that can be executed in the case of imaging under the imaging condition may be limited. In such a case, executable dynamic analysis processing can be determined based on the imaging request.

For example, determination in a case where imaging request 1 for which dynamic analysis processing A is required to be performed is inputted will be described. Referring to FIG. 3, imaging apparatus 1 can image an image having a quality with which dynamic analysis processing A can be performed, and thus, imaging apparatus 1 is "possible" for imaging request 1. Referring to FIG. 3, however, imaging apparatus 2 cannot image an image having a quality with which dynamic analysis processing A can be performed, and thus, imaging apparatus 2 is "impossible" for imaging request 1.

Determination section 220 may prompt a doctor to change an imaging condition(s) of imaging request 1 such that imaging apparatus 2 satisfies the imaging condition(s). For example, instead of increasing the imaging power to increase the resolution, determination section 220 may prompt a doctor to shorten the imaging time or to lower the frame rate. Determination section 220 may change an imaging condition(s) of imaging request 1 such that imaging apparatus 2 satisfies the imaging condition(s).

When an imaging condition is included in an imaging request, determination section 220 can determine "possible" in a case where an imaging apparatus can satisfy the imaging condition included in the imaging request, and can determine "impossible" in a case where an imaging apparatus cannot satisfy the imaging condition.

In addition, determination section 220 may determine "possible" in a case where an imaging apparatus can satisfy both the dynamic analysis processing and the imaging condition(s), and may determine "impossible" when an imaging apparatus cannot satisfy one of them.

FIG. 4 illustrates exemplary results of when the determination described above has been performed. FIG. 4 illustrates, in the situation in which the quality control information illustrated in FIG. 3 is stored in storage section 130, results in a case where imaging request 1 requiring dynamic analysis processing A, imaging request 2 requiring dynamic analysis processing B, imaging request 3 requiring dynamic analysis processing C, and imaging request 4 requiring dynamic analysis processing B and C are inputted.

Input/output section 110 may output the determination results in FIG. 4 as they are as the determination results of determination section 220, but may also perform another output. Input/output section 110 may change the display form(s) such as the color of the character, the font of the character, the size of the character, the color of the background, and the like according to "possible" or "impossible".

As the determination results of determination section 220, it is possible to output whether imaging apparatuses can perform imaging or not in response to each imaging request. FIG. 5 is a diagram illustrating display examples of whether the imaging apparatuses can perform imaging in response to each imaging request.

In a case where it is determined that a plurality of imaging apparatuses can perform imaging, the imaging apparatus may be determined in consideration of other condition(s).

In a case where it is determined that a plurality of imaging apparatuses can perform imaging, the imaging apparatus may be determined according to the situation of a patient. For example, in a case where the state of a patient makes it difficult to move the patient to an imaging room, a mobile imaging apparatus may be selected. Alternatively, for example, an imaging apparatus capable of performing imaging earliest may be determined in consideration of the schedules of each imaging apparatus. An analysis apparatus for which the number of corresponding dynamic analysis processing is small may be preferentially determined.

Input/output section 110 is an apparatus operated by a doctor, and determination section 220 may cause input/output section 1110 to output the display examples illustrated in FIG. 5. Input/output section 110 may change the display form(s) such as the color of the character, the font of the character, the size of the character, the color of the background, and the like according to "possible" or "impossible".

The determination results of determination section 220 can be outputted to each imaging apparatus as to whether each imaging apparatus can process imaging requests. FIG. 6 is a diagram illustrating examples of outputting to each imaging apparatus as to each imaging apparatus can process imaging requests.

Input/output section 110 is included in each of imaging apparatuses 140 to 170, and determination section 220 may cause input/output section 110 of each of imaging apparatuses 140 to 170 to output the display examples illustrated in FIG. 6. Input/output section 110 may change the display form(s) such as the color of the character, the font of the character, the size of the character, the color of the background, and the like according to "possible" or "impossible".

Flowchart

Figure 7:
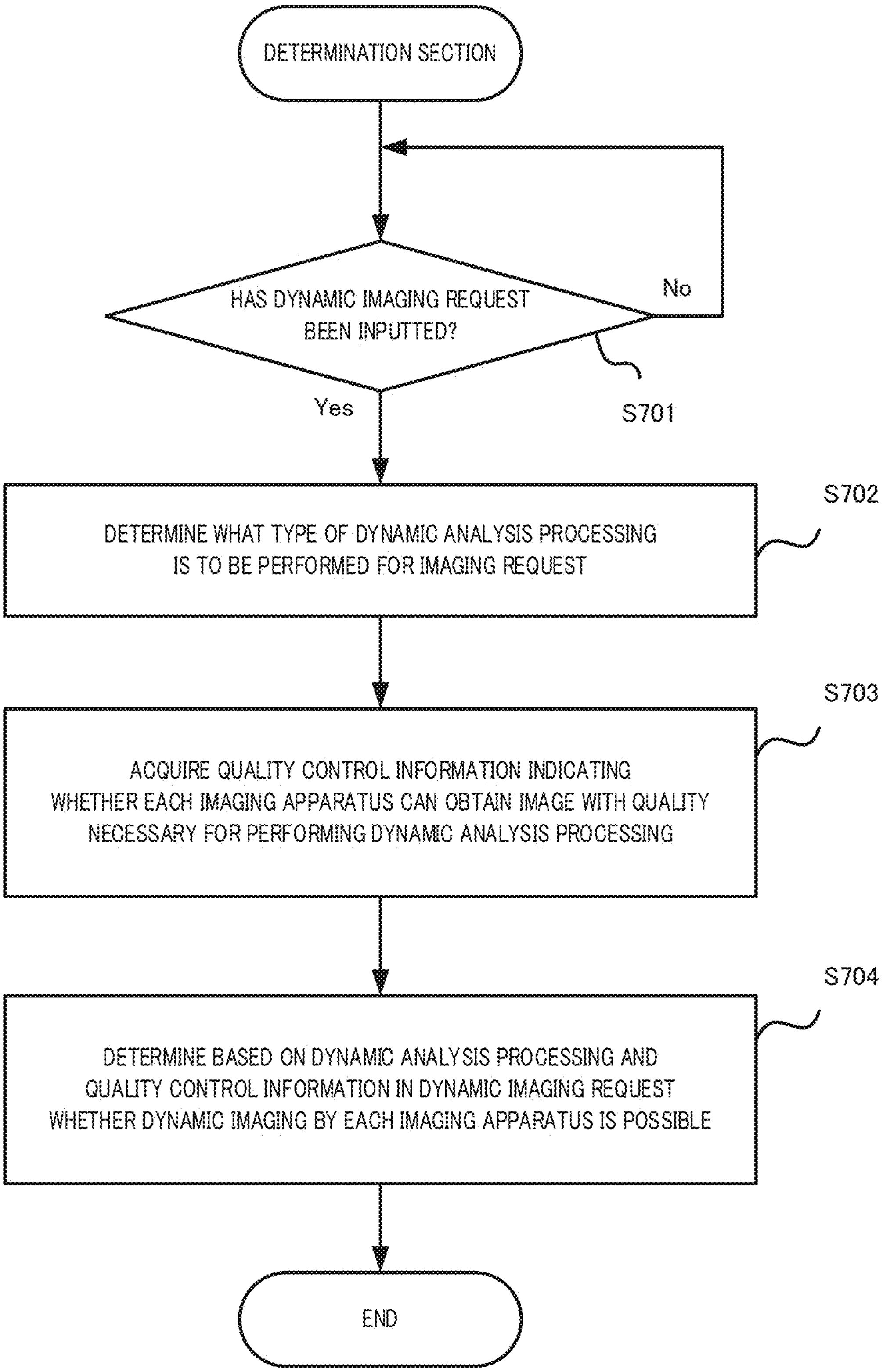
FIG. 7 is a diagram illustrating a flowchart of processing performed by a determination section.

FIG. 7 is a diagram illustrating a flowchart of processing performed by determination section 220.

Determination section 220 determines whether a dynamic imaging request has been inputted (step S701).

In a case where a dynamic imaging request has not been inputted, determination section 220 causes the flow to return to step S701 and waits for an input of an imaging request.

Determination section 220 processes an inputted imaging request. Specifically, in a case where an imaging request has been inputted, determination section 220 determines what type of dynamic analysis processing is to be performed for the imaging request (step S702). In a case where the imaging request includes information on dynamic analysis processing, for example, the type of dynamic analysis, determination section 220 may extract the dynamic analysis processing from the imaging request. Determination section 220 may determine what type of dynamic analysis processing is to be performed for the imaging request, based on the patient for whom the imaging request has been made and the medical record of the patent.

Determination section 220 acquires, from storage section 130, quality control information indicating whether each imaging apparatus can obtain an image with a quality necessary for performing dynamic analysis processing (step S703). The quality control information may be acquired from a cloud. Determination section 220 may store the quality control information acquired in advance.

Determination section 220 determines based on the dynamic analysis processing determined in step S702 and the quality control information acquired in step S703 whether the dynamic imaging by the imaging apparatus is possible (step S704).

Embodiment 2

Embodiment 2 indicates a case where the management apparatus executes processing in response to, for example, an imaging request from a radiologist to an imaging apparatus.

When a request to acquire an imaging request is inputted to input/output section 110 from each imaging apparatus, determination section 220 may request RIS 100 to transmit the imaging request. In a case where each imaging apparatus stores whether imaging with a quality necessary for performing dynamic analysis processing is possible, input/output section 110 may acquire the quality control information from a storage section of the imaging apparatus. In this case, storage section 130 may be the storage section of the imaging apparatus.

When the required imaging request has been inputted from input/output section 110, determination section 220 may execute the processing in steps S702 to S704.

For an imaging request for which each imaging apparatus cannot perform imaging, a change in an imaging condition(s) may be requested. For example, imaging apparatus 2 may prompt a doctor to change an imaging condition(s) of imaging request 1 to an imaging condition(s) with which imaging apparatus 2 satisfies the quality necessary for dynamic analysis processing A. For example, imaging apparatus 2 may suggest a doctor to shorten the imaging time or lengthen the pulse interval instead of increasing the imaging power of imaging request 1 in order to increase the resolution.

Hardware Configuration

Figure 8:
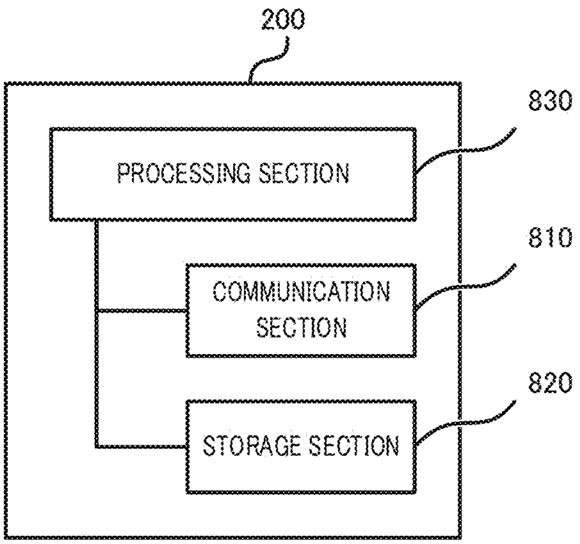
FIG. 8 is a diagram illustrating a hardware configuration of the management apparatus.

FIG. 8 is a diagram illustrating a hardware configuration of management apparatus 200. Management apparatus 200 includes communication section 810, storage section 820, and processing section 830.

Communication section 810 communicates input/output data with input/output section 110. Communication section 810 may receive quality control information from storage section 130. For the communication of communication section 810, any communication means such as a local area network (LAN), a small computer system interface (SCSI), a universal serial bus (USB), Bluetooth, or the Internet can be used.

Storage section 820 stores a program to be processed by processing section 830. Storage section 820 may store the quality control information stored in storage section 130. The storage section is a storage means such as an HDD or an SSD.

Processing section 830 may be, for example, a computer such as a CPU. Processing section 830 is connected to communication section 810 and storage section 820, and controls management apparatus 200 in its entirety.

Figure 9:
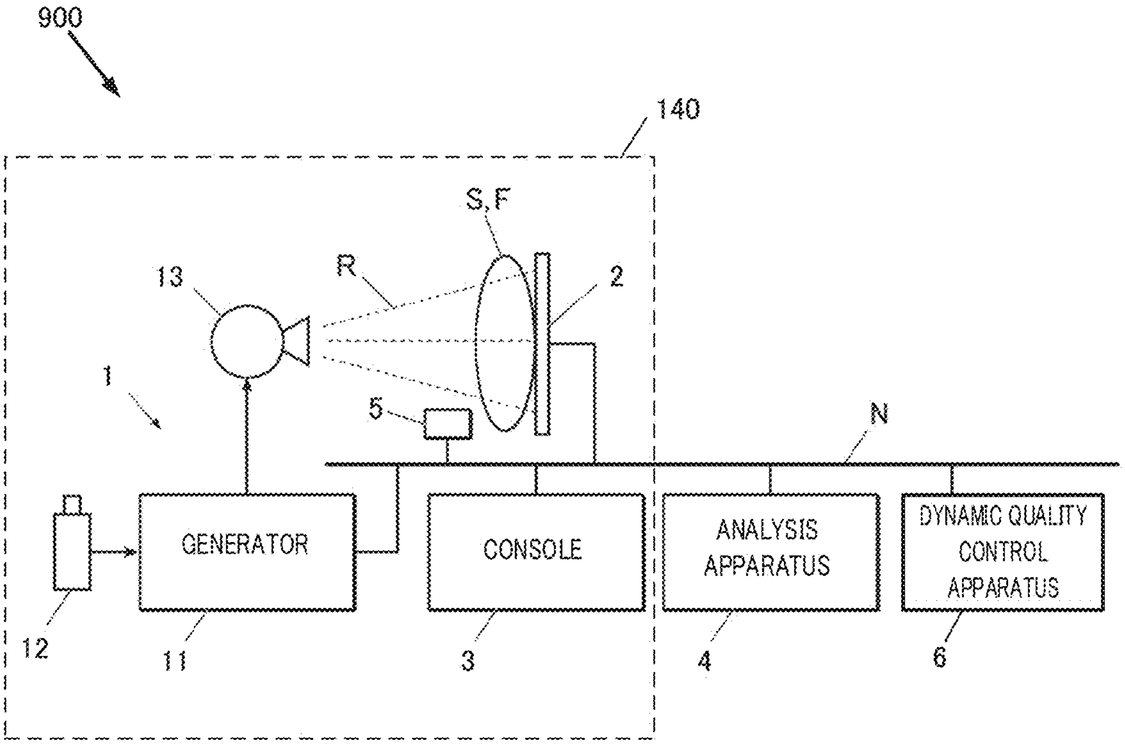
FIG. 9 is a diagram illustrating a configuration example of a radiography system.

FIG. 9 is a diagram illustrating a configuration example of radiography system 900.

Radiography system 900 includes radiation generating apparatus 1, radiation detector 2, console 3, analysis apparatus 4, optical camera 5, and dynamic quality control apparatus 6. Radiation generating apparatus 1, radiation detector 2, console 3, analysis apparatus 4, optical camera 5, and dynamic quality control apparatus 6 are connected by network N and can communicate with each other. Radiation generation apparatus 1 and radiation detector 2 constitute imaging apparatus 140. Imaging apparatus 140 may include console 3. FIG. 9 illustrates a case in which imaging apparatus 140 includes console 3.

Console 3 may be input/output section 110. Dynamic quality control apparatus 6 may be determination section 220 and storage section 130.

Although embodiments have been described above with reference to the drawings, the present disclosure is not limited to such examples. It is obvious that a person skilled in the art can conceive of various change examples or modification examples within the scope described in the claims. It is to be understood that such changes or modifications also belong to the technical scope of the present disclosure. Furthermore, the constituent elements in the embodiments may be combined as appropriate without departing from the spirit of the present disclosure.

(1) A management apparatus in an embodiment of the present disclosure includes: a storage that stores quality control information which is information on an imaging capability of a radiography apparatus; and a hardware processor that determines whether dynamic imaging by the radiation imaging apparatus is possible in response to a dynamic imaging request, based on the quality control information.

(2) In the management apparatus in an embodiment of the present disclosure, in the management apparatus of (1), the quality control information is information indicating whether each of a plurality of the radiography apparatuses is capable of obtaining an image with a quality necessary for performing dynamic analysis processing, and the hardware processor determines whether the dynamic imaging by each of the plurality of radiography apparatuses is possible in response to each of a plurality of the dynamic imaging requests, based on the quality control information.

(3) In the management apparatus in an embodiment of the present disclosure, the management apparatus of (1) further includes an inputter/outputter to which the dynamic imaging request is inputted and which outputs a determination result of the hardware processor.

(4) In the management apparatus in an embodiment of the present disclosure, in the management apparatus of (1), the dynamic imaging request includes information on dynamic analysis processing on a frame image obtained by dynamic imaging using radiation.

(5) In the management apparatus in an embodiment of the present disclosure, in the management apparatus of (4), the information on the dynamic analysis processing includes a type of the dynamic analysis processing.

(6) In the management apparatus in an embodiment of the present disclosure, in the management apparatus of (3), the inputter/outputter outputs whether the radiography apparatus is capable of performing the dynamic imaging in response to the dynamic imaging request.

(7) In the management apparatus in an embodiment of the present disclosure, in the management apparatus of (3), the inputter/outputter outputs whether the dynamic imaging request is possible with respect to the radiography apparatus.

(8) In the management apparatus in an embodiment of the present disclosure, in the management apparatus of (1), the dynamic imaging request includes an imaging condition.

(9) A radiology information system in an embodiment of the present disclosure includes the management apparatus of (1).

(10) A management method in an embodiment of the present disclosure includes: processing, in a system to which a radiography apparatus is connected, a dynamic imaging request that has been inputted; and determining, in the system, whether imaging by the radiography apparatus is possible in response to the dynamic imaging request, based on quality control information which is information on an imaging capability of the radiography apparatus.

(11) In a non-transitory computer-readable recording medium storing a program in an embodiment of the present disclosure, the program causes a computer to execute: processing a dynamic imaging request that has been inputted; and determining whether dynamic imaging by a radiography apparatus is possible, based on quality control information which is information on an imaging capability of the radiography apparatus.

(12) In the non-transitory computer-readable recording medium storing the program in an embodiment of the present disclosure, in the non-transitory computer-readable recording medium storing the program in (11), the dynamic imaging request includes information on dynamic analysis processing on a frame image obtained by dynamic imaging using radiation.

(13) In the non-transitory computer-readable recording medium storing the program in an embodiment of the present disclosure, in the non-transitory computer-readable recording medium storing the program in (11), the information on the dynamic analysis processing includes a type of the dynamic analysis processing.

(14) A management system in an embodiment of the present disclosure stores quality control information which is information on an imaging capability of a radiography apparatus, and determines whether dynamic imaging by the radiography apparatus is possible in response to a dynamic imaging request, based on the quality control information.

INDUSTRIAL APPLICABILITY

The present disclosure is useful for management in dynamic imaging using radiation.

Although embodiments of the present invention have been described and illustrated in detail, the disclosed embodiments are made for purpose of illustration and example only and not limitation. The scope of the present invention should be interpreted by terms of the appended claims.

What is claimed is:

1. A management apparatus, comprising:

a storage that stores quality control information which is information on an imaging capability of a radiography apparatus; and a hardware processor that determines whether dynamic imaging by the radiation imaging apparatus is possible in response to a dynamic imaging request, based on the quality control information.

2. The management apparatus according to claim 1, wherein:

the quality control information is information indicating whether each of a plurality of the radiography apparatuses is capable of obtaining an image with a quality necessary for performing dynamic analysis processing, and the hardware processor determines whether the dynamic imaging by each of the plurality of radiography apparatuses is possible in response to each of a plurality of the dynamic imaging requests, based on the quality control information.

3. The management apparatus according to claim 1, further comprising an inputter/outputter to which the dynamic imaging request is inputted and which outputs a determination result of the hardware processor.

4. The management apparatus according to claim 3, wherein the inputter/outputter outputs whether the radiography apparatus is capable of performing the dynamic imaging in response to the dynamic imaging request.

5. The management apparatus according to claim 3, wherein the inputter/outputter outputs whether the dynamic imaging request is possible with respect to the radiography apparatus.

6. The management apparatus according to claim 1, wherein the dynamic imaging request includes information on dynamic analysis processing on a frame image obtained by dynamic imaging using radiation.

7. The management apparatus according to claim 6, wherein the information on the dynamic analysis processing includes a type of the dynamic analysis processing.

8. The management apparatus according to claim 1, wherein the dynamic imaging request includes an imaging condition.

9. A radiology information system, comprising the management apparatus according to claim 1.

10. A management method, comprising:

processing, in a system to which a radiography apparatus is connected, a dynamic imaging request that has been inputted; and determining, in the system, whether imaging by the radiography apparatus is possible in response to the dynamic imaging request, based on quality control information which is information on an imaging capability of the radiography apparatus.

11. A non-transitory computer-readable recording medium storing a program, the program causing a computer to execute:

processing a dynamic imaging request that has been inputted; and determining whether dynamic imaging by a radiography apparatus is possible, based on quality control information which is information on an imaging capability of the radiography apparatus.

12. The non-transitory computer-readable recording medium storing the program according to claim 11, wherein the dynamic imaging request includes information on dynamic analysis processing on a frame image obtained by dynamic imaging using radiation.

13. The non-transitory computer-readable recording medium storing the program according to claim 12, wherein the information on the dynamic analysis processing includes a type of the dynamic analysis processing.

14. A management system, wherein:

the management system stores quality control information which is information on an imaging capability of a radiography apparatus, and the management system determines whether dynamic imaging by the radiography apparatus is possible in response to a dynamic imaging request, based on the quality control information.

* * * * *